US 6,641,074 B2

United States Patent
Shih et al.

(10) Patent No.: US 6,641,074 B2
(45) Date of Patent: Nov. 4, 2003

(54) SEAT BELT WEBBING PRETENSIONER USING MEMS DEVICES

(75) Inventors: Christopher C. Shih, Torrance, CA (US); Douglas P. Campbell, Metamora, MI (US); Lee D. Bergerson, Fountain Valley, CA (US); Dean M. Esterberg, Tempe, AZ (US); Paul A. Bowers, Ray, MI (US); Ernst M. Faigle, Dryden, MI (US); Homer W. Fogle, Jr., Mesa, AZ (US); Ivan L. Stonich, Hermosa Beach, CA (US); David H. Lewis, Jr., Irvine, CA (US); Eric N. Streif, Higley, AZ (US); Brian R. Pitstick, Mesa, AZ (US); Timothy A. Swann, Mesa, AZ (US); Roy D. Van Wynsberghe, Mesa, AZ (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/756,409

(22) Filed: Jan. 8, 2001

(65) Prior Publication Data

US 2002/0088890 A1 Jul. 11, 2002

(51) Int. Cl.[7] .............................................. B60R 22/46
(52) U.S. Cl. ...................................... 242/374; 280/806
(58) Field of Search ......................... 242/374; 280/806; 297/478, 480; 60/632–638

(56) References Cited

U.S. PATENT DOCUMENTS

| 2,911,504 | A | | 11/1959 | Cohn |
| 3,503,814 | A | | 3/1970 | Helms, Jr. |
| 3,724,870 | A | | 4/1973 | Kurokawa et al. |
| 4,308,721 | A | * | 1/1982 | Thomas et al. ............... 60/634 |
| 5,167,426 | A | | 12/1992 | Mihm et al. |
| 5,681,004 | A | * | 10/1997 | Specht ....................... 242/374 |
| 5,842,344 | A | | 12/1998 | Schmid |
| 5,873,599 | A | * | 2/1999 | Bauer et al. ................. 280/806 |
| 5,880,921 | A | | 3/1999 | Tham et al. |
| 5,984,350 | A | | 11/1999 | Hagan et al. |
| 6,000,287 | A | | 12/1999 | Menzel |
| 6,028,343 | A | | 2/2000 | Chan et al. |
| 6,079,745 | A | * | 6/2000 | Wier .......................... 280/806 |
| 6,149,190 | A | | 11/2000 | Galvin et al. |
| 6,431,594 | B1 | | 8/2002 | Swann et al. |

FOREIGN PATENT DOCUMENTS

| DE | 9308273 | 9/1993 |
| EP | 0903487 A2 | 3/1999 |
| EP | 0903487 | 3/1999 |

OTHER PUBLICATIONS

Prior art article, D. Lewis, et al., "Digital Micropulsion", Sensors and Actuators A; Physical, vol. 80, No. 2, Elsevier, Mar., 2000, p. 143, 154.

(List continued on next page.)

Primary Examiner—John M. Jillions
(74) Attorney, Agent, or Firm—Tarolli, Sundheim, Covell & Tummino L.L.P.

(57) ABSTRACT

A pretensioner (50) tensions vehicle seat belt webbing (18). The pretensioner (50) has a member (52) movable by an actuating fluid to tension the seat belt webbing (18). The pretensioner (50) further has at least one microelectromechanical system (MEMS) device (120) energizable to supply actuating fluid to move the member (52).

15 Claims, 4 Drawing Sheets

OTHER PUBLICATIONS

MEMS "Virtual Learning Cybercenter and *E (du)* — Pages", "So What are these MEMS?"; "MEMS Overview from *MCNC*".

"MEMS, Microengineering and Aerospace Systems", S. W. Janson and H. Helvajian, Center for Microtechnology, The Aerospace Corporation, Los Angeles, CA; K. Breuer, Aero/Astro Department, MIT, Cambridge, MA.

U.S. Patent Application Serial No. 09/755,704, Filed Jan. 5, 2001; entitled Air Bag Inflators.

U.S. Patent Application Serial No. 09/818,129, Filed Mar. 27, 2001; entitled Air Bag Inflators.

U.S. Patent Application Serial No. 09/933,926, filed Aug. 21, 2001 entitled Inflatable Seat Belt Using MEMS Device.

U.S. Patent Application Serial No. 09/843,546, Filed Apr. 26, 2001 entitled Initiators for Air Bag Inflators.

* cited by examiner

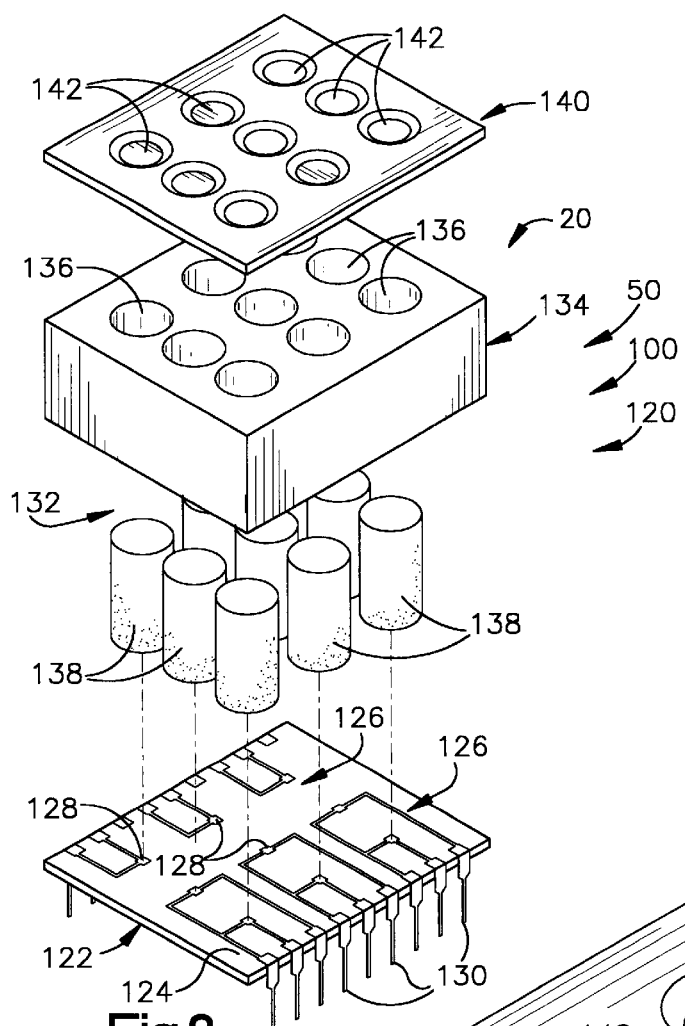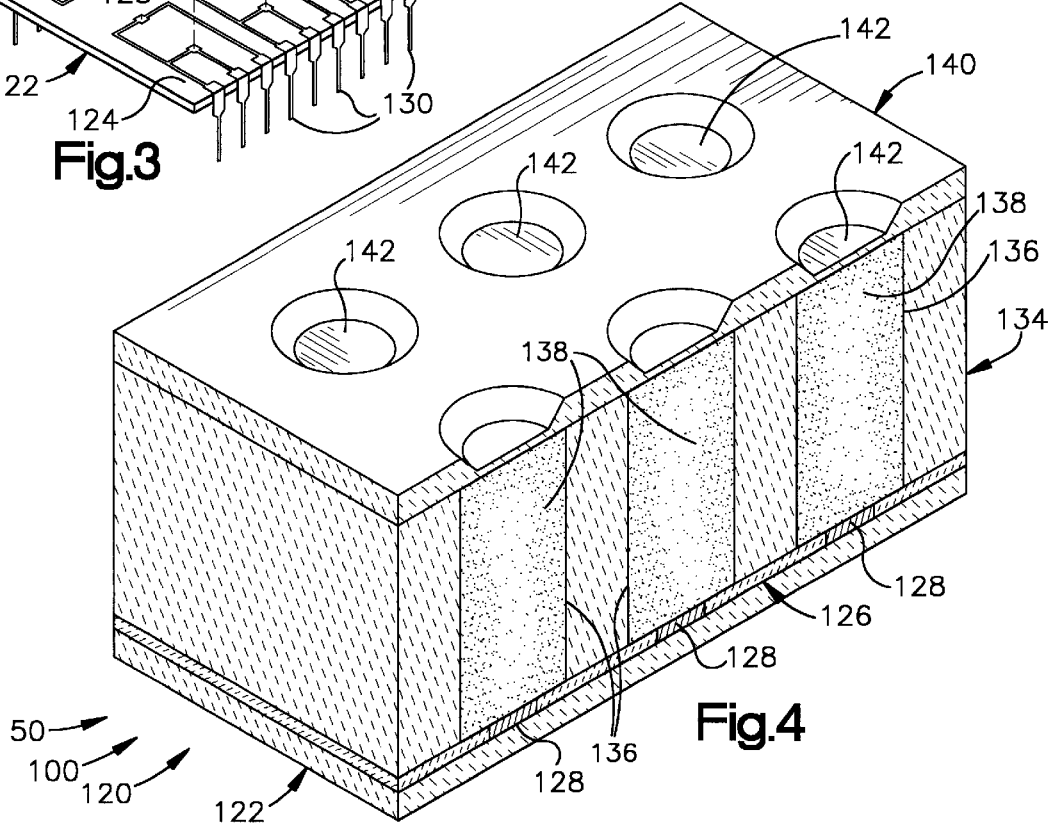

SEAT BELT WEBBING PRETENSIONER USING MEMS DEVICES

BACKGROUND OF THE INVENTION

1. Technical Field

The present invention relates to a vehicle seat belt webbing pretensioner. In particular, the present invention relates to a fluid source for powering a vehicle seat belt webbing pretensioner.

2. Description of the Prior Art

A typical vehicle seat belt system includes a length of belt webbing wound on a spool of a seat belt webbing retractor. The belt webbing is extensible about a vehicle occupant to restrain the occupant. The belt webbing spool rotates in a belt withdrawal direction as the occupant withdraws belt webbing from the retractor. A rewind spring is connected with the belt webbing spool and biases the belt webbing spool for rotation in an opposite belt retraction direction.

The seat belt webbing may sometimes become slack around the vehicle occupant. It is known to use a pretensioner to remove slack from the seat belt webbing in the event of a vehicle collision. The slack can be removed in different ways—for example, by rotating the spool of the retractor in the belt retraction direction, by pulling on a buckle of the seat belt system, or by applying force to the belt webbing adjacent an anchor of the seat belt system.

It is known to use a pyrotechnic device, such as a gas generating initiator, to provide fluid under pressure for tensioning the belt webbing. The fluid is used to rotate the retractor spool in the belt retraction direction or to move a piston to pull directly on the belt webbing.

SUMMARY OF THE INVENTION

The present invention is a pretensioner for pretensioning vehicle seat belt webbing. The pretensioner comprises a member movable by an actuating fluid to tension the seat belt webbing. The pretensioner further comprises at least one microelectromechanical device (MEMS device) energizable to supply the actuating fluid to move the member.

BRIEF DESCRIPTION OF THE DRAWINGS

Further features of the present invention will become apparent to one skilled in the art to which the present invention relates from reading the following specification with reference to the accompanying drawings, in which:

FIG. 3 is an exploded perspective view of a MEMS device that forms part of the pretensioner of FIG. 2;

FIG. 4 is a partial perspective view of the MEMS device of FIG. 3;

DESCRIPTION OF PREFERRED EMBODIMENTS OF THE INVENTION

Figure 1:
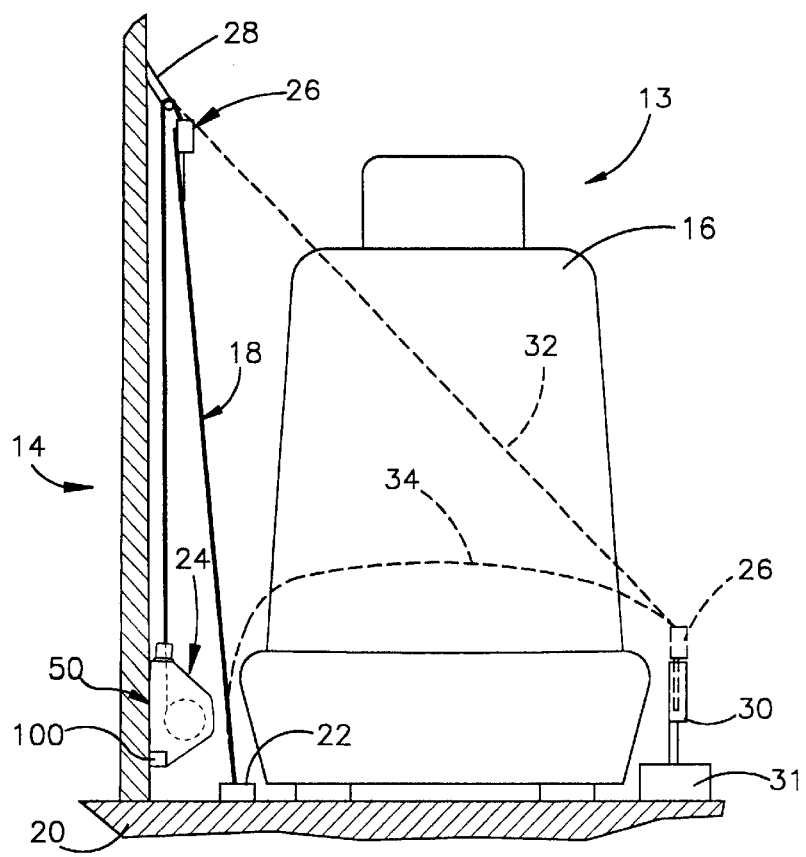
FIG. 1 is a schematic illustration of a vehicle seat belt system including a pretensioner in accordance with the present invention.

The present invention relates to an apparatus for helping to protect a vehicle occupant and, in particular, to a fluid source usable in a seat belt webbing pretensioner. As representative of the present invention, FIG. 1 illustrates a seat belt pretensioner 50 that is part of a three-point continuous loop seat belt system 13 for use in restraining an occupant of a vehicle 14.

During operation of the vehicle 14, an occupant of the vehicle sits on a seat 16, which is illustrated as a front passenger seat of the vehicle. A length of belt webbing 18 is extensible about the vehicle occupant. One end of the length of belt webbing 18 is anchored to the vehicle body 20 at an anchor point 22. The opposite end of the belt webbing 18 is attached to a retractor 24 secured to the vehicle body 20. Intermediate its ends, the belt webbing 18 passes through a tongue assembly 26 and a turning loop or D-ring 28. When the seat belt system 13 is not in use, the belt webbing 18 is wound on the retractor 24 and is oriented generally vertically on one side of the seat 16, as shown in solid lines in FIG. 1.

To engage the seat belt system 13, the tongue assembly 26 is manually grasped and is pulled across the lap and torso of the occupant sitting in the seat 16. As the tongue assembly 26 is pulled across the lap and torso of the occupant, the tongue assembly moves along the belt webbing 18, and the belt webbing is unwound from the retractor 24. When the belt webbing 18 has been pulled across the lap and torso of the occupant, the tongue assembly 26 is connected with a buckle 30, as shown in dashed lines in FIG. 1. The buckle 30 is disposed on the side of the seat 16 opposite the anchor point 22 and the retractor 24. When the seat belt system 13 is thus buckled, the length of belt webbing 18 is divided by the tongue assembly 26 into a torso portion 32, which extends across the torso of the occupant, and a lap portion 34, which extends across the lap of the occupant.

Figure 2:
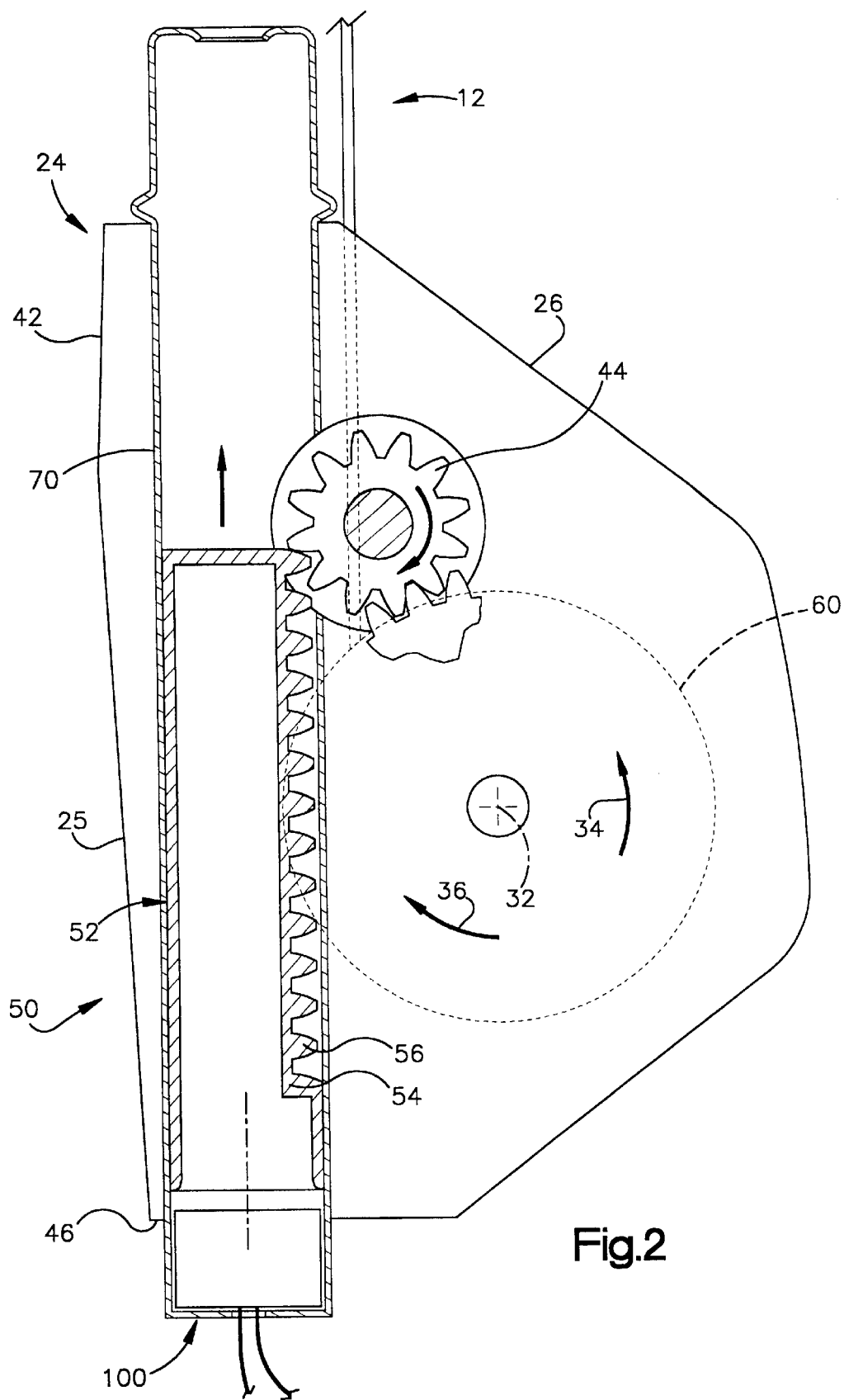
FIG. 2 is an enlarged view, partially in section, of the pretensioner of FIG. 1.

The retractor 24 is fixed to the vehicle body in a known manner (not shown). As shown in FIG. 2, the retractor 24 includes a housing 42 made from sheet metal stamped and formed to a U-shaped configuration. The housing 42 includes a back wall 25 and spaced, parallel side walls 26 (only one of which is shown), which extend generally perpendicular to the back wall. The housing 42 supports the belt webbing spool 60 for rotation about a belt webbing spool axis 32 in a belt retraction direction 34 and in an opposite belt withdrawal direction 36. A rewind spring assembly (not shown) biases the belt webbing spool 60 for rotation in the belt retraction direction 34.

The pretensioner 50 is operable to rotate the belt webbing spool 60 in the belt retraction direction 34 upon sensing a vehicle condition for which tensioning of the seat belt webbing is desired. Such a vehicle condition may be, for example, sudden vehicle deceleration above a predetermined deceleration, or withdrawal of belt webbing 18 from the belt webbing spool 60 at a rate exceeding a predetermined rate, such as can occur in a vehicle collision. Such a vehicle condition can also be a side impact to the vehicle or a rollover condition of the vehicle.

Figure 5:
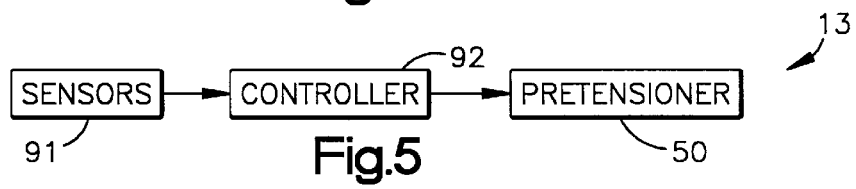
FIG. 5 is a schematic diagram of a system for actuating the pretensioner of FIG. 2.

The seat belt system 13 (FIG. 5) further includes one or more sensors 91 for sensing the occurrence of such a vehicle condition. The sensor 91 may be a mechanical sensor, which uses a member movable upon sudden vehicle deceleration and/or a side impact or a rollover condition to actuate an electric circuit. The sensor 91 may also be an electronic sensor, for example, a piezoelectric transducer or pressure sensor. The seat belt system 13 may also comprise a controller 92 that determines the existence of such a vehicle condition on the basis of parameters including vehicle speed, engine speed, road wheel speed, occupant position, etc. Upon sensing a vehicle condition for which tensioning of the seat belt webbing 18 is desired, the sensor 91 (or the controller 92) sends an electric actuating signal to the pretensioner 50.

The retractor housing 42 (FIG. 2) supports a rotatable pinion 44, which is connected in a force-transmitting relationship with the spool 60 of the retractor 24. The housing 42 also supports a cylinder 70 fixed in the housing. The pretensioner 50 includes a piston 52 for tensioning the seat belt webbing 18. The piston 52 is supported in the cylinder 70 for sliding movement between an unactuated position and an actuated position.

The piston 52 has an outer side wall 54 on one side of which is formed a set of rack teeth 56. The rack teeth 56 on the piston 52 are capable of meshing engagement with the pinion 44. As a result, upward linear movement of the piston 52 within the cylinder 70, as described below, causes rotation of the pinion 44 and, thereby, rotation of the retractor spool 60 in the belt retraction direction 34.

A fluid source 100 constructed in accordance with a first embodiment of the invention is mounted in a base 46 of the housing 42 so as to direct fluid under pressure into the cylinder 70. The fluid source 100 comprises one or more microelectromechanical system (MEMS) devices 120 (FIGS. 3 and 4) connected in fluid communication with the cylinder 70. In the illustrated embodiment, each one of the MEMS devices 120 is configured as shown in FIGS. 3 and 4. Each one of the MEMS devices 120 is a multi-layered device that may be manufactured in a manner similar to that described in European Patent Application EP 0 903 487 A2, and in the article D. Lewis, et al., "Digital Micropropulsion", Sensors and Actuators A: Physical, Vol. 80, No. 2, Elsevier, March, 2000, p. 143–154.

Specifically, each MEMS device 120 includes a bottom layer or base 122. The base 122 is made from a rectangular block of material the upper surface 124 of which includes electric circuitry 126. The electric circuitry 126 includes a plurality of individually energizable electric heating elements 128 connected with terminal pins 130. In the illustrated embodiment, the electric circuitry 126 includes nine individually energizable electric heating elements 128 connected with nine terminal pins 130. The nine heating elements 128 are spaced apart in a rectangular 3×3 array on the base 122.

The heating elements 128 may be polysilicon resistors or other micro-resistors, such as nickel, niobium and niobium nitride. The heating elements 128 may, alternatively, be made as a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, mount Vernon, N.Y., Internet site www.sigmundcohn.com, under the brand name PYROFUZE®. When the two metallic elements of the reactive bridge are brought to the initiating temperature by flow of electric current, they alloy rapidly resulting in instant deflagration without support of oxygen.

The base 122 may be made using standard complementary metal oxide semiconductor (CMOS) processes. The base 122 may be made from silicon or other suitable material, such as a polyimide or a ceramic. The electric circuitry 126 on the base 122 may also include address and control electronics.

The MEMS device 120 also includes a middle layer 132 formed on the base 122. The middle layer 132 includes a propellant block 134. The propellant block 134 defines a series of cylindrical plenums or propellant chambers 136. In the illustrated embodiment, the propellant block 134 includes nine propellant chambers 136. The nine propellant chambers 136 are spaced apart in the propellant block 134 in the same rectangular 3×3 array as the nine heating elements 128 on the base 122. The heating elements 128 are associated in a one-to-one relationship with the propellant chambers 136 for, when energized, heating the contents of the propellant chambers.

One suitable material for the propellant block 134 is hard anodized aluminum. Another suitable material is Foturan brand photosensitive glass. Foturan is a registered trademark of Schott Glaswerke of Mainz, Germany for its products made of glass or glass ceramic materials. These materials can be used to make very fine structures with tight tolerances and high aspect ratios (hole depth to hole width).

The middle layer 132 of the MEMS device 120 also includes, in each one of the chambers 136, contents that are heatable to increase the pressure in the chamber. In the illustrated embodiment, the contents of the chambers 136 are bodies 138 of a solid propellant material, or pyrotechnic material, which is actuatable, or ignitable, upon the application of heat, to produce fluid under pressure. Each propellant body 138 has a generally cylindrical configuration and fills a respective one of the propellant chambers 136.

One suitable material for the propellant bodies 138 is zirconium potassium perchlorate, which is commonly used in igniters for air bag inflators. Another suitable material is potassium dinitrobenzofuroxan (KDNBF).

The MEMS device 120 also includes a top layer or outer layer 140 having a plurality of individually rupturable segments or diaphragms 142, which serve as burst disks. The diaphragms 142 are thin-walled portions of the outer layer 140. The outer layer 140 includes the nine individual diaphragms 142. The nine diaphragms 142 are spaced apart in the outer layer 140 in the same rectangular 3×3 array as the nine propellant chambers 136 and the nine heating elements 128.

The outer layer 140 may be made from aluminum tape or Kapton brand tape. The diaphragms 142 may be thin silicon nitride remaining after an anisotropic wet etch through a silicon wafer. Other suitable materials include ceramics, such as silicon carbide, and metals. The three layers 122, 132, and 140 of the MEMS device 30 may be bonded together with a high performance adhesive tape or an aerospace grade RTV adhesive. The three layers 122, 132 and 140 may be secured together by a known bonding method, such as a high performance adhesive tape or an aerospace grade RTV adhesive.

The individual diaphragms 142 of the outer layer 140 are associated in a one-to-one relationship with the individual propellant chambers 136. Each diaphragm 142 closes a respective propellant chamber 136. Each one of the diaphragms 142 is rupturable due to an increase in pressure in its associated chamber 136 to enable flow of fluid out of the associated chamber.

Figure 6:
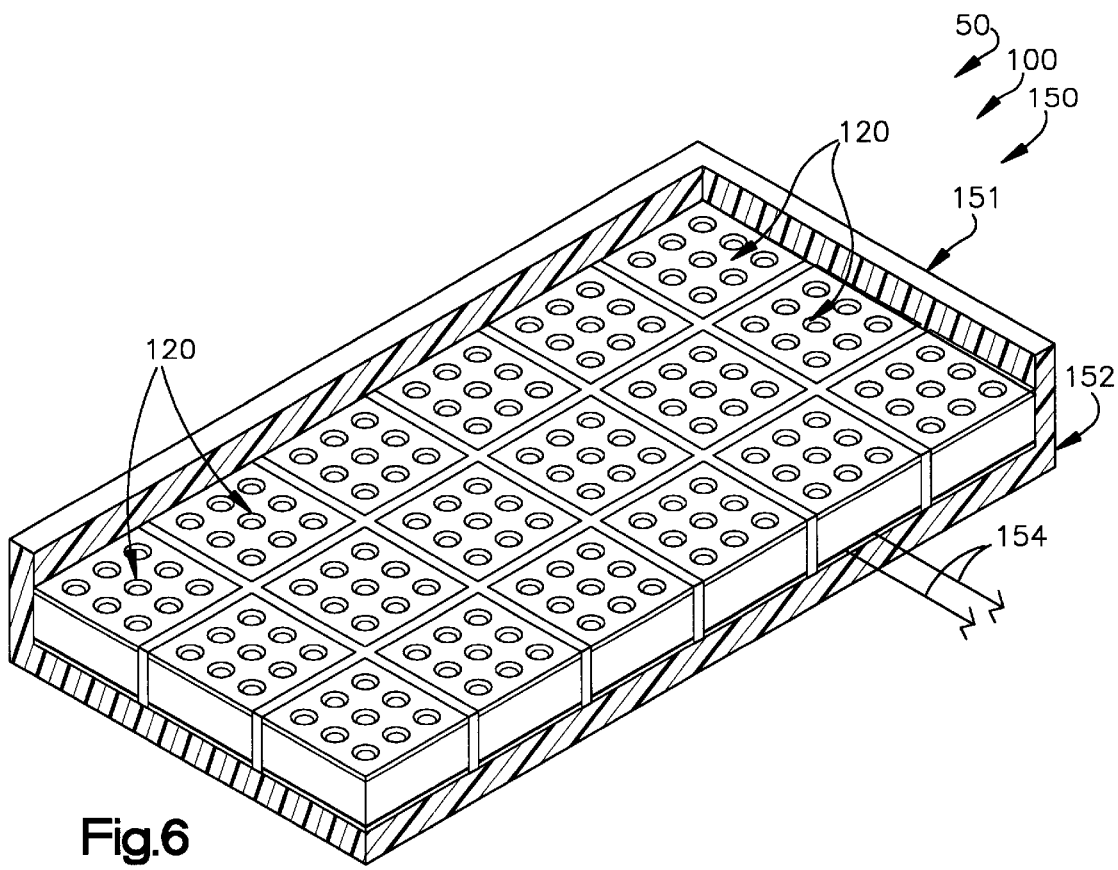
FIG. 6 is a partial perspective view showing of a plurality of MEMS devices that may form part of the pretensioner of FIG. 2.

The individual MEMS devices 120 may be mounted in an array 150, as shown in FIG. 6, which extends across the diameter of cylinder 70 (FIG. 2) of the housing 42. Specifically, the MEMS devices 120 (FIG. 6) are mounted in a housing shown partially at 151. The housing 151 has a base 152. The housing base 152 has a pair of lead wires 154 that are electrically connected with pin mounting openings (not shown) in the housing base 152 for receiving the terminal pins of all of the MEMS devices 120.

The terminal pins 130 of each MEMS device 120 in the array 150 engage the pin mounting openings of the housing base 152 to connect the MEMS devices electrically with the lead wires 154. The lead wires 154 are electrically connected with the vehicle electric circuitry.

In the event of a vehicle collision or other event for which pretensioning of the seat belt webbing 18 is desired, the vehicle electric circuitry sends an actuation signal over the lead wires 154 to the fluid source including the MEMS devices 120. The vehicle electric circuitry is operable to provide an actuation signal for energizing any selected one or more of the MEMS devices 120 in the pretensioner 50, at a selected time. In addition, the vehicle electric circuitry is operable to provide an actuation signal for energizing any selected one or more of the heating elements 128 within each one of the MEMS devices 120, at a selected time. Thus, the pretensioner 50 may be effectively "digital" in construction and operation. That is, the pretensioner 50 comprises a very large number of discrete, individually actuatable fluid sources.

When an individual heating element 128 of one of the MEMS devices 120 is energized, the heating element generates heat, which is transmitted into the associated propellant body 138. The propellant body 138 ignites and generates a primary fluid under pressure in the associated propellant chamber 136. The increased pressure in the propellant chamber 136 causes the associated diaphragm 142 of the top layer 140 to rupture, which enables the primary fluid to flow out of the chamber.

The primary fluid is directed to the cylinder 70 of the pretensioner 50 and, in particular, against the piston 52. The flow of fluid causes the piston 52 to move linearly upward, as shown in FIG. 2. The movement of the piston 52 causes the rack teeth 56 on the piston 52 to engage and rotate the pinion 44 in a first direction. Rotation of the pinion 44 results in rotation of the spool 60 of the retractor 24 in the belt retraction direction 34, thereby removing slack from the seat belt webbing 18. The movement of the piston 52 in the upward direction toward and past the pinion 44 is stopped by tension produced in the seat belt webbing 18.

After the pretensioning movement is completed and the pretensioning condition is over, the occupant of the vehicle seat 16 may move forward in the seat. This causes the seat belt webbing 18 to be withdrawn from the retractor 24 and to rotate the retractor spool 60 in the belt withdrawal direction 36. The spool rotation causes the pinion 44 to rotate in a second direction opposite the first direction. The rotation of the pinion 44 moves the piston 52 back towards its initial starting position, that is, downward as viewed in FIG. 2. The piston 52 moves far enough downward that the rack teeth 56 disengage from the pinion 44 and thus release the retractor spool 60 for normal (unpretensioned) rotation.

The rate and volume of flow of the primary fluid are dependent on, and vary with, the number of MEMS devices 120 that are energized, the number of propellant bodies 138 that are ignited, and the time at which each individual propellant body is ignited. For example, the flow of primary fluid is dependent on the volume of each propellant chamber 136, and the type and amount of propellant 138 disposed in the propellant chambers.

In the microthruster application described in European Patent Application EP 0 903 487 A2, each plenum or propellant chamber is about 1.5 mm tall (axial length) and up to about 0.7 mm in diameter. When MEMS devices of this type serve as a primary fluid source for a pretensioner, the depth of each plenum chamber can be readily increased by a factor of at least two or three, and the diameter of each plenum chamber can be readily increased by at least a factor of two.

Increasing both the diameter and depth of a plenum chamber by those factors can increase the volume of the plenum chamber by a factor of 12. A MEMS device 120 for use in the pretensioner 50 and having an array comprising three to fifteen plenum chambers may have a size in the range of about one-quarter inch square to one inch square. The plenum chambers may be from about 0.5 mm to about 2.0 mm in diameter and from about 1 mm to 10 mm in height. A plurality of individually actuatable MEMS devices of this size range can provide a fluid source having fluid flow sufficient to pretension the seat belt webbing 18 as desired.

The pretensioner 50 in accordance with the present invention can include a large number of propellant bodies 138, thus enabling a substantial range of tailoring of the fluid flow actuating the pretensioner 50. The vehicle electric circuitry can control the rate of fluid flow actuating the pretensioner 50 over a period of time by selectively causing the ignition of any one or more of a plurality of propellant bodies 138 over a selected period of time. The circuitry is operative, in a known manner, to actuate the propellant bodies 138 all at once or in any controlled sequence depending on information about the vehicle condition and occupant information received from appropriate sensors forming part of the vehicle electric circuitry, such as the sensors 91.

It is possible to use a fluid propellant, rather than a solid propellant, in MEMS devices for actuating the pretensioner 50. Additionally, to avoid making a complex housing having numerous welds to contain liquid, such a MEMS device may include a plurality of individual containers of fluid, inserted into chambers in a single propellant block. The fluid containers may directly replace the solid propellant bodies in an arrangement similar to FIG. 3.

Figure 7:
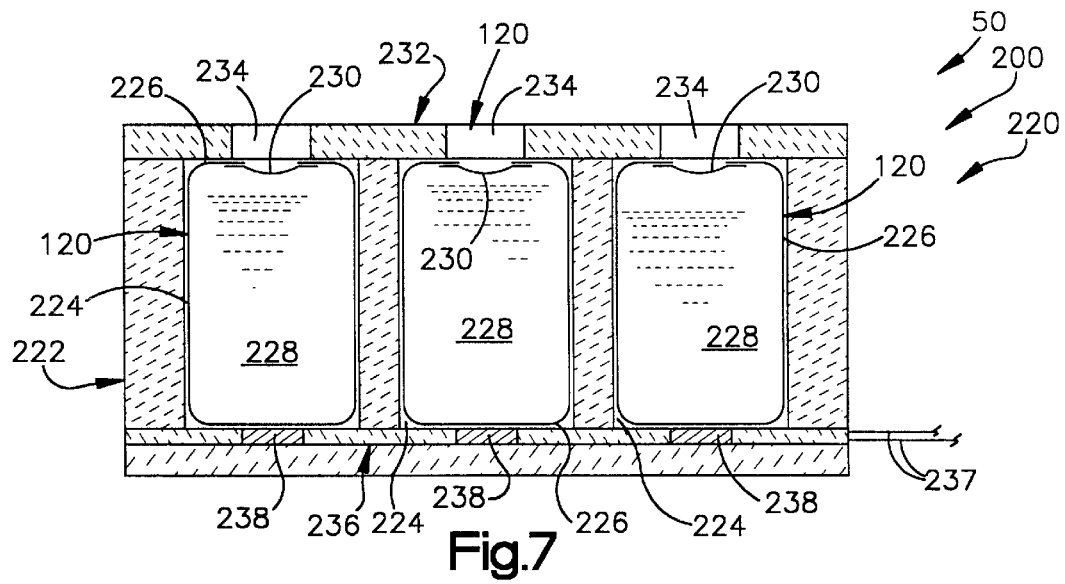
FIG. 7 is a schematic sectional view of a MEMS device in accordance with another feature of the present invention.

As an example, FIG. 7 illustrates schematically a pretensioner fluid source 200 constructed in accordance with a second embodiment of the invention. The fluid source 200 may be substituted for the fluid source 100 in the pretensioner 50.

The fluid source 200 includes a MEMS device 220. The MEMS device 220 includes a housing 222, which may define nine chambers 224 (three shown). A container 226 is located in each chamber 224. Each container 226 contains a fluid 228. The fluid 228 may be a gas or a liquid, possibly under pressure. The container 226 is sealed by a rupturable wall portion 230, such as a burst disk.

A manifold 232 extends across the top of the housing 222. The manifold 232 has a plurality of fluid outlets 234, which are aligned in a one-to-one relationship with the rupturable wall portions 230 of the containers 226.

The MEMS device 220 includes a base 236, which has lead wires 237 electrically connected with a plurality of heating elements 238. The heating elements 238 are associated in a one-to-one relationship with the containers 226. The combination of the heating elements 238 and the containers 226 forms the MEMS device 220. The lead wires 237 are also electrically connected with vehicle electric circuitry.

In the event of a vehicle collision or other event for which pretensioning of the seat belt webbing 18 is desired, the vehicle electric circuitry sends an actuation signal over the lead wires 237 to the MEMS device 220. The vehicle electric circuitry is operable to provide an actuation signal for energizing any selected one or more of the containers 226.

When a container 226 is energized, its heating element 238 generates heat, which is transmitted into the container 226. The fluid 228 in the container 226 is heated and increases in pressure. For example, if the fluid 228 is a liquid, it may be vaporized to a gaseous state. The increased pressure causes the associated rupturable wall portion 230 of the container 226 to rupture, which enables the fluid 228 to flow to the pretensioner 50 as a primary fluid for the pretensioner.

The fluid 228 is directed through the cylinder 70 and against the piston 52. The rate and volume of flow of the fluid 228 are dependent on, and vary with, the number of containers 226 that are energized, and the time of actuation of each individual container 226. Therefore, the vehicle electric circuitry can control the output of the MEMS device 220, both in time and duration, by selectively energizing any one or more of a plurality of the containers 226 of the MEMS devices 220 over a selected period of time.

Figure 8:
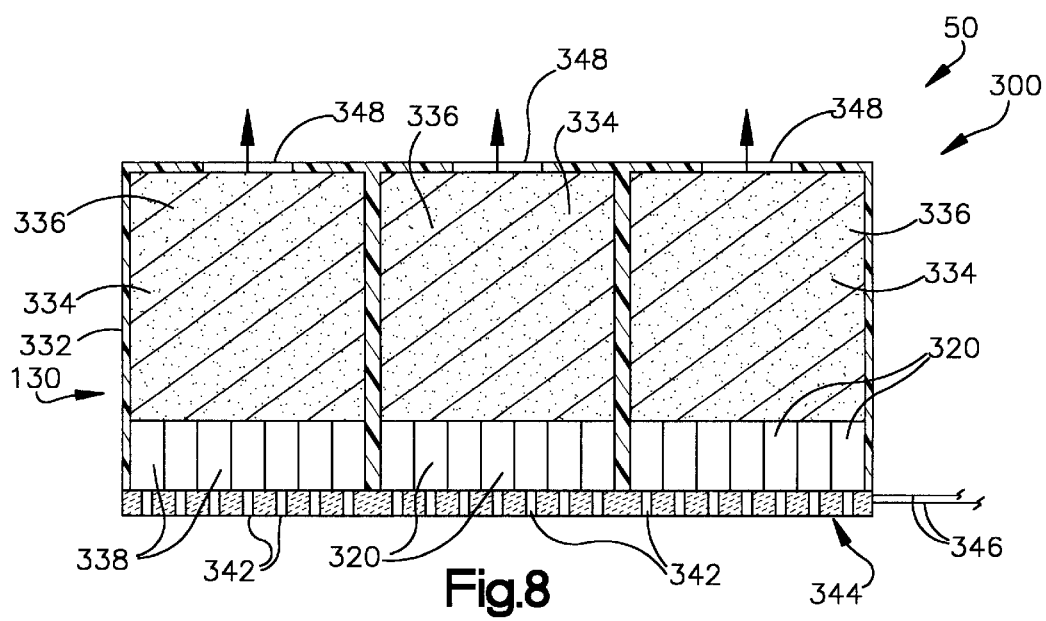
FIG. 8 is a schematic sectional view of a MEMS device in accordance with yet another feature of the present invention.

FIG. 8 illustrates schematically a pretensioner fluid source 300 constructed in accordance with a third embodiment of the invention. The pretensioner fluid source 300 includes a main pyrotechnic charge that may be variably ignited by MEMS devices similar to the MEMS devices of the first embodiment.

The fluid source 300 includes a plurality of MEMS devices 320, which function as igniters rather than as primary fluid sources. Specifically, the fluid source 300 includes a housing 332 that defines a plurality of chambers. The housing 332 defines three chambers 334. In each one of the chambers 334 is located a respective main pyrotechnic charge 336. Each one of the pyrotechnic charges 336 is separately ignitable by heat to produce inflation fluid under pressure.

A plurality of MEMS devices 320 are associated with each one of the chambers 334 and, therefore, with each one of the pyrotechnic charges 336. In the embodiment shown in FIG. 8, seven MEMS devices 320 are associated with each one of the chambers 334. Each one of the MEMS devices 320 includes heatable contents in the form of a solid propellant material, which, when heated, ignites to produce hot combustion products. Each one of the MEMS devices 320 also includes an electric heating element 342.

The heating elements 342 for all three chambers 334 of the fluid source 300 are formed on a base 344. The base 344 may be manufactured in a manner similar to that of the base 122 (FIG. 4). Lead wires 346 extend from the base 344 and are electrically connected with vehicle electric circuitry.

In the event of a vehicle collision or other event for which pretensioning of the seat belt webbing is desired, vehicle electric circuitry sends an actuation signal over the lead wires 346 to the MEMS devices 320. The vehicle electric circuitry is operable to provide an actuation signal for energizing any selected one or more of the chambers 334 of the fluid source 300.

The MEMS devices 320 are used to control the rate of combustion of the main pyrotechnic charges 336. When an individual MEMS device 320 is energized, its heating element 342 generates heat to ignite its corresponding solid propellant material. The combustion products of the solid propellant material contact the adjacent pyrotechnic charge 336, igniting it. The ignition of the pyrotechnic material 336 produces fluid under pressure, which is directed through an outlet 348 and the cylinder 70 to actuate the pretensioner 50.

The output of the fluid source 300 is dependent on, and varies with, the number of chambers 334 that are energized, the number of MEMS devices 320 corresponding to each chamber that are energized, and the time of actuation of each individual chamber and MEMS device. For example, if only one chamber 334 in the entire fluid source 300 is energized, then only one of the three pyrotechnic charges 336 is ignited. Also, the one pyrotechnic charge 336 that is ignited burns relatively slowly because it is ignited only at one location. The fluid output of the fluid source 300 is relatively low.

In contrast, if all the MEMS devices 320 for one of the three pyrotechnic charges 336 are ignited, that pyrotechnic charge burns relatively rapidly because it is ignited over a larger surface area. Further, if more than one of the pyrotechnic charges 336 is ignited by its associated MEMS devices 320, the output of the fluid source 300 will increase substantially.

In this manner, the vehicle electric circuitry can control the output of the fluid source 300, both in time and duration, by selectively energizing any one or more of the MEMS devices 320 over a selected period of time. The MEMS devices 320 are small enough that a large number of them may be used in the relatively small space typically occupied by one fluid source.

From the above description of the invention, those skilled in the art will perceive improvements, changes and modifications in the invention. Such improvements, changes and modifications within the skill of the art are intended to be covered by the appended claims.

Having described the invention, we claim:

1. A pretensioner for pretensioning vehicle seat belt webbing, said pretensioner comprising:

a member movable by an actuating fluid to tension the seat belt webbing; and at least one microelectromechanical system (MEMS) device energizable to supply actuating fluid to move said member, said at least one MEMS device having a size in the range from about one-quarter inch square to about one inch square.

2. A pretensioner as set forth in claim 1 wherein said pretensioner comprises a plurality of MEMS devices individually energizable to supply actuating fluid to move said member, and means for selectively controlling energizing of said plurality of MEMS devices to control the flow of actuating fluid to said member.

3. A pretensioner as set forth in claim 1 wherein said MEMS device includes a solid pyrotechnic material that is ignited upon energizing of said MEMS device to produce said actuating fluid.

4. A pretensioner for vehicle seat belt webbing, said pretensioner comprising:

a member movable by an actuating fluid to tension the seat belt webbing; and at least one multi-layered device for providing actuating fluid to move said member, said device including:

an outer layer having a plurality of individually rupturable segments;

a middle layer having a plurality of individual chambers associated in a one-to-one relationship with said rupturable segments of said outer layer and being closed by said rupturable segments, each one of said chambers having contents heatable to increase the pressure in said one chamber; and a base layer having a plurality of individually energizable electric heating elements associated in a oneto-one relationship with said chambers for, when energized, heating the contents of said chambers;

each one of said rupturable segments being rupturable due to an increase in pressure in its associated chamber to enable flow of said actuating fluid out of said chamber; and means for selectively energizing said individually energizable electric heating elements.

5. A pretensioner as set forth in claim 4 wherein each of said plurality of chambers is in the range of from about 0.5 mm to about 2 mm in diameter and in the range of from about 1 mm to about 6 mm in height.

6. A pretensioner as set forth in claim 4 wherein said contents of said chambers are heatable at different times to control actuation of said pretensioner.

7. A pretensioner as set forth in claim 4 wherein said multi-layered device includes a solid pyrotechnic material that is ignited upon actuation of said pretensioner to produce a fluid under pressure.

8. A pretensioner as set forth in claim 4 wherein said multi-layered device has a size in the range of from about one-quarter inch square to about one inch square.

9. A pretensioner as set forth in claim 4 wherein said heatable contents comprises a pyrotechnic material that is ignitable to produce fluid under pressure.

10. A pretensioner as set forth in claim 4 wherein said heatable contents comprises a fluid that is heatable to increase its pressure.

11. A pretensioner as set forth in claim 4 wherein said electric heating elements are micro-resistors.

12. A pretensioner comprising:

a member movable to tension seat belt webbing;

an array of individually energizable devices for producing combustion products for moving said member; and means for energizing selected ones of said array of individually energizable devices, said energizing means including a base that extends across said array and a plurality of electric heating elements associated with each of said energizable devices and connected to the base with terminal pins that are received in said base, said energizing means further comprising control means for directing electric current into selected ones of said plurality of electric heating elements to energize said selected ones of said energizable devices for producing combustion products for moving said member.

13. An apparatus as set forth in claim 12 wherein said electric heating elements are resistors made using a complementary metal oxide semiconductor (CMOS) process.

14. A pretensioner for pretensioning vehicle seat belt webbing, said pretensioner comprising:

a member movable by an actuating fluid to tension the seat belt webbing; and at least one microelectromechanical system (MEMS) device energizable to supply actuating fluid to move said member, said MEMS device including a quantity of fluid that is heated and pressurized upon energizing of said MEMS device to produce said actuating fluid.

15. A pretensioner for pretensioning vehicle seat belt webbing, said pretensioner comprising:

a member movable by an actuating fluid to tension the seat belt webbing; and at least one microelectromechanical system (MEMS) device energizable to supply actuating fluid to move said member, said MEMS device has a size in the range of from about one-quarter inch square to about one inch square and includes an array of at least three plenum chambers.

* * * * *